(12) United States Patent
Jurinek

(10) Patent No.: US 6,196,634 B1
(45) Date of Patent: Mar. 6, 2001

(54) DUMPING BED LINER FOR PICKUP TRUCK

(76) Inventor: John Jurinek, 9 S. 737 William St., Hinsdale, IL (US) 60521

(*) Notice: Subject to any disclaimer, the term of this patent is extended or adjusted under 35 U.S.C. 154(b) by 0 days.

(21) Appl. No.: 09/192,967

(22) Filed: Nov. 16, 1998

(51) Int. Cl.$^7$ .................................................... B60P 1/16
(52) U.S. Cl. ........................................ 298/1 A; 298/22 R
(58) Field of Search ................................. 298/1 A, 22 R, 298/17 T; 296/184, 39.2

(56) References Cited

U.S. PATENT DOCUMENTS

| | | | |
|---|---|---|---|
| 2,640,725 | 6/1953 | Dale | 298/22 |
| 2,684,864 | 7/1954 | Anthony | 298/22 |
| 2,685,475 | 8/1954 | Anthony | 298/22 |
| 3,600,038 | 8/1971 | Jones et al. | 298/22 P |
| 3,617,090 | 11/1971 | Huffman et al. | 298/22 J |
| 3,740,097 | 6/1973 | Parker et al. | 298/1 A |
| 3,833,261 | 9/1974 | Dingler | 298/1 A |
| 3,871,706 * | 3/1975 | Odem | 298/1 A |
| 4,139,236 | 2/1979 | Hill et al. | 298/14 |
| 4,647,110 * | 3/1987 | McKee | 298/1 A |
| 4,681,371 * | 7/1987 | Leonard | 298/1 A |

OTHER PUBLICATIONS

Maxi–Dump™ brochure by Maxi Products Co., Inc., 2536 Center Ave., Janesville, WI 53546, (608) 755–1199, 2 pages.
E–Z Dumper® Truck brochure by E–Z Dumper, P.O. Box 31, Waynesboro, PA 17268; 1–888–Dumpers 3 pages.

* cited by examiner

*Primary Examiner*—Stephen T. Gordon
(74) *Attorney, Agent, or Firm*—Jefferson Perkins Foley & Lardner

(57) ABSTRACT

A movable bed liner hinged at the back end for converting a pickup truck into a dump truck. A pair of linear hydraulic rams disposed in respective compartments in front of the wheel wells is operable to raise and lower the dump body liner. This invention uses otherwise unusable, "dead" space in front of the wheel wells and preserves the appearance of a normal flatbed pickup truck.

12 Claims, 5 Drawing Sheets

DUMPING BED LINER FOR PICKUP TRUCK

TECHNICAL FIELD OF THE INVENTION

This invention relates in general to dumping apparatus for trucks, and in particular to a dumpable pickup truck bed liner and actuating apparatus.

BACKGROUND OF THE INVENTION

Prior art structures exist for use in converting a regular pickup or flatbed truck into a dump truck. These prior art structures have relative structural complexity problems that may influence their practical value.

For example, some conventional structures act to lift the existing body of the truck, and require major modifications to the truck body structure. The structural and ride characteristics of the truck are affected. Certain other prior art structures use a central hydraulic cylinder which results in stability problems during the dumping operation.

In other cases, such as the structures shown in Dingler, U.S. Pat. No. 3,833,261 and Hill et al., U.S. Pat. No. 4,139,236, two hydraulic cylinders have been provided, but the ride characteristics of the truck worsen when the body of the truck is being lifted. In other prior art structures, where a bed liner is provided and two hydraulic cylinders were used, a modification was made in the truck body. Using two single-acting cylinders avoids the control complexity and safety concerns of using two double-acting hydraulic cylinders. Also, using two double-acting cylinders results in wasted space in the truck.

Another prior art structure (Anthony, U.S. Pat. No. 2,685,475) shows two hydraulic cylinders hinged on a common pipe or shaft in tandem on the front of the truck bed. But this design results in wasted space in the front of the liner.

Another prior art structure (Anthony, U.S. Pat. No. 2,684,864) shows a bed liner using two hydraulic cylinders (either double-acting or single-acting) that are partially disposed in front of the truck wheel wells and use separate hydraulics to operate the cylinders; this structure requires a separate bottom frame that is attached to the bottom floor of a pickup truck creating unusable space under the liner. The space occupied by the hydraulic cylinder from the front to the back on each side is unusable for other purposes. Also the hydraulic components occupy space in front of the insert container on the floor of the flatbed. This creates another unusable space adding to the loss of carry-on volume.

SUMMARY OF THE INVENTION

The present invention provides a dumping bed liner which converts a conventional pickup truck to a dump truck. Inwardly protruding recesses are formed in the left and right sidewalls of a liner which, in its lowered position, is disposed adjacent the conventional pickup truck bed. The inwardly protruding recesses are formed at the junction of the left and right sidewalls of the liner with a bottom panel of the liner, and extend from a position over the rear wheel of the pickup truck forwardly so as to create a pair of lifting mechanism compartments. In each one of the compartments is housed, in its retracted position, a lifting mechanism such a hydraulic ram.

According to a further aspect of the invention, these inwardly protruding recesses fit over the respective left and right rear wheel wells of a conventional truck bed, emulating the appearance of such wheel wells. In a preferred embodiment, the left and right inwardly protruding recesses extend forwardly from these wheel wells to the front panel of the liner, providing a pleasing appearance to the liner.

The apparatus can be bolted onto a conventional truck bed to convert the pickup truck into a dump truck, and can be easily removed when no longer desired. Structural changes or additions are not made to the existing truck body, thus preserving the appearance and structural integrity of the truck.

BRIEF DESCRIPTION OF THE DRAWINGS

Further aspects of the invention and their advantages will be discerned in the following detailed description, in which like characters identify like parts and in which:

FIG. 2a is a sectional view taken substantially along line 2a—2a of FIG. 2;

DETAILED DESCRIPTION OF ILLUSTRATED EMBODIMENT

Figure 1:
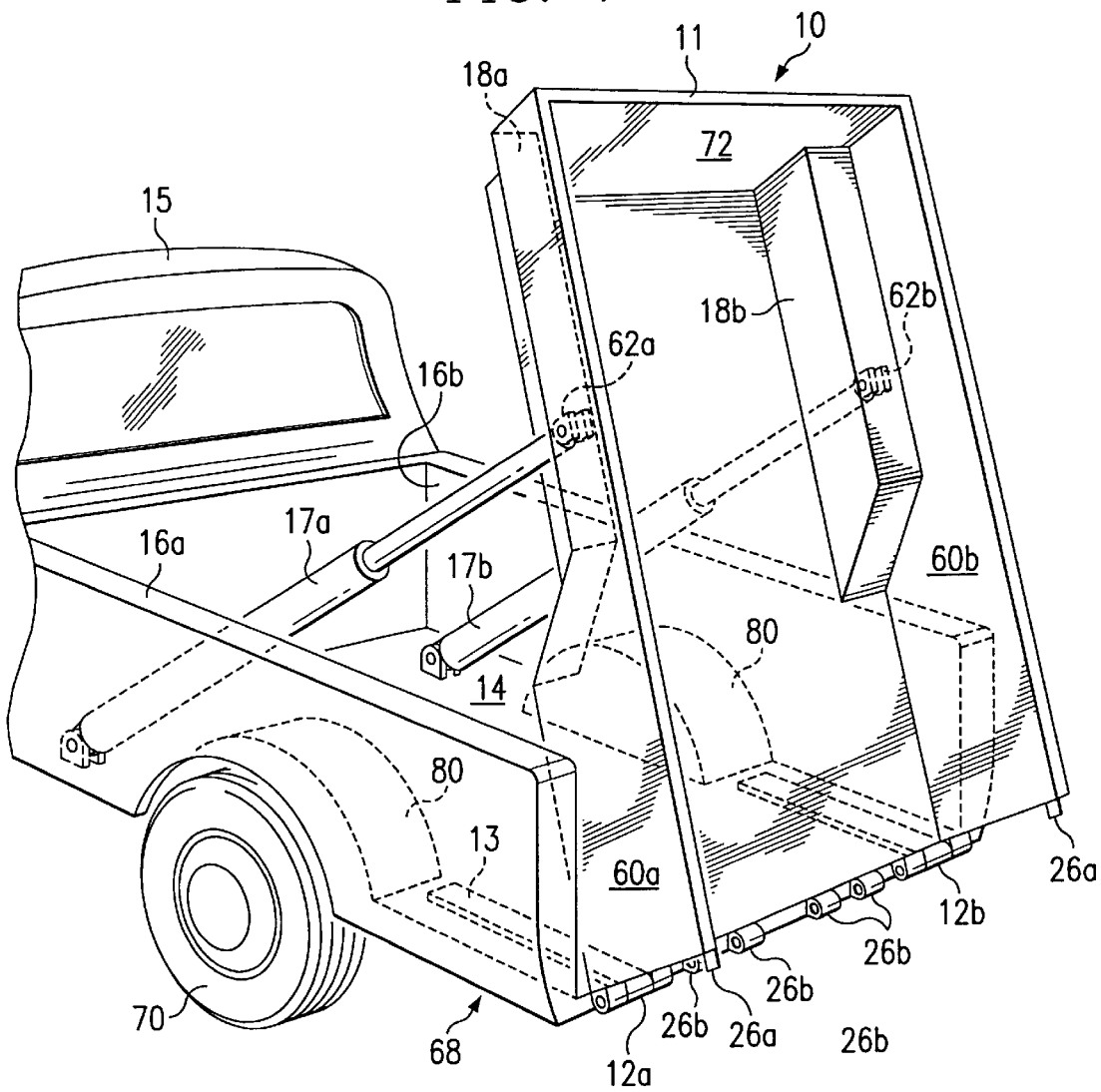
FIG. 1 is a perspective view of a rear portion of a typical pickup truck, showing the truck bed liner in an upright dumping position, with two hydraulic rams fully extended.

As shown in FIG. 1 a dumping apparatus, generally indicated at 10, includes a liner body 11, preferably hinged at the rear to the rear end of a conventional pickup truck bed 68 with hinges 12a and 12b. Hinge brackets 13 are attached to the truck bed bottom 14 of the conventional pickup truck 15, preferably by bolts (not shown). The dumping liner body 11 fits closely between the upstanding conventional interior sidewalls 16a and 16b of the truck bed 68, with only enough tolerance to prevent binding during dumping operations, resulting in no wasted space between the liner sides 60a and 60b and the corresponding truck bed sides 16a and 16b. Ends 62a and 62b of each of a pair of parallel-actuating, spaced apart hydraulic rams 17a and 17b are connected to respective lower surfaces 64 (FIGS. 2a and 3) of the top portions 19 of a pair of inwardly protruding recesses 18a and 18b of the liner body 11. In place of the linear hydraulic rams shown, other lifting mechanisms could be used, such as folding arms or other mechanisms by which a prop or support unfolds from a retracted position in which it is stored in front of the truck wheel well, to an extended position in which it is displacing the front end of the body liner 11 upward relative to the rear end.

The liner recesses 18a and 18b have rear portions which fit over the conventional wheel wells 80 of the pick up truck bed 68, and front portions formed continuously with the respective rear portions so as to form respective lifting mechanism compartments in front of the conventional pickup truck wheel wells. Preferably, each recess 18a, 18b extends from a location over a rear wheel 70 to a front panel 72 of the liner body. Also preferably, the top surfaces of the inwardly protruding recesses 18a and 18b are at substantially the same height throughout.

The conventional pickup truck tailgate is removed in the dumping position shown in FIG. 1. This eliminates the problem of dumped material remaining on the tailgate.

For simplicity and ease of understanding certain supporting structural members incorporated into liner body 11 are not shown in FIG. 1. These structural members are shown in FIGS. 2, 2a, 3 and 4. In the illustrated embodiment, such members are specified to support a maximum load of two tons or 4000 pounds. The truck 15 must have a rating equal to two tons or more to carry this load. The maximum rating for the truck will determine the maximum load of each dumping apparatus. The thickness and number of the preferably steel structural supporting members must be such that when loaded to maximum, the bending or torsion of the liner body 11 will not be so great as to cause the liner body 11 to bind with any portion of the conventional pickup truck bed 68.

Figure 2:
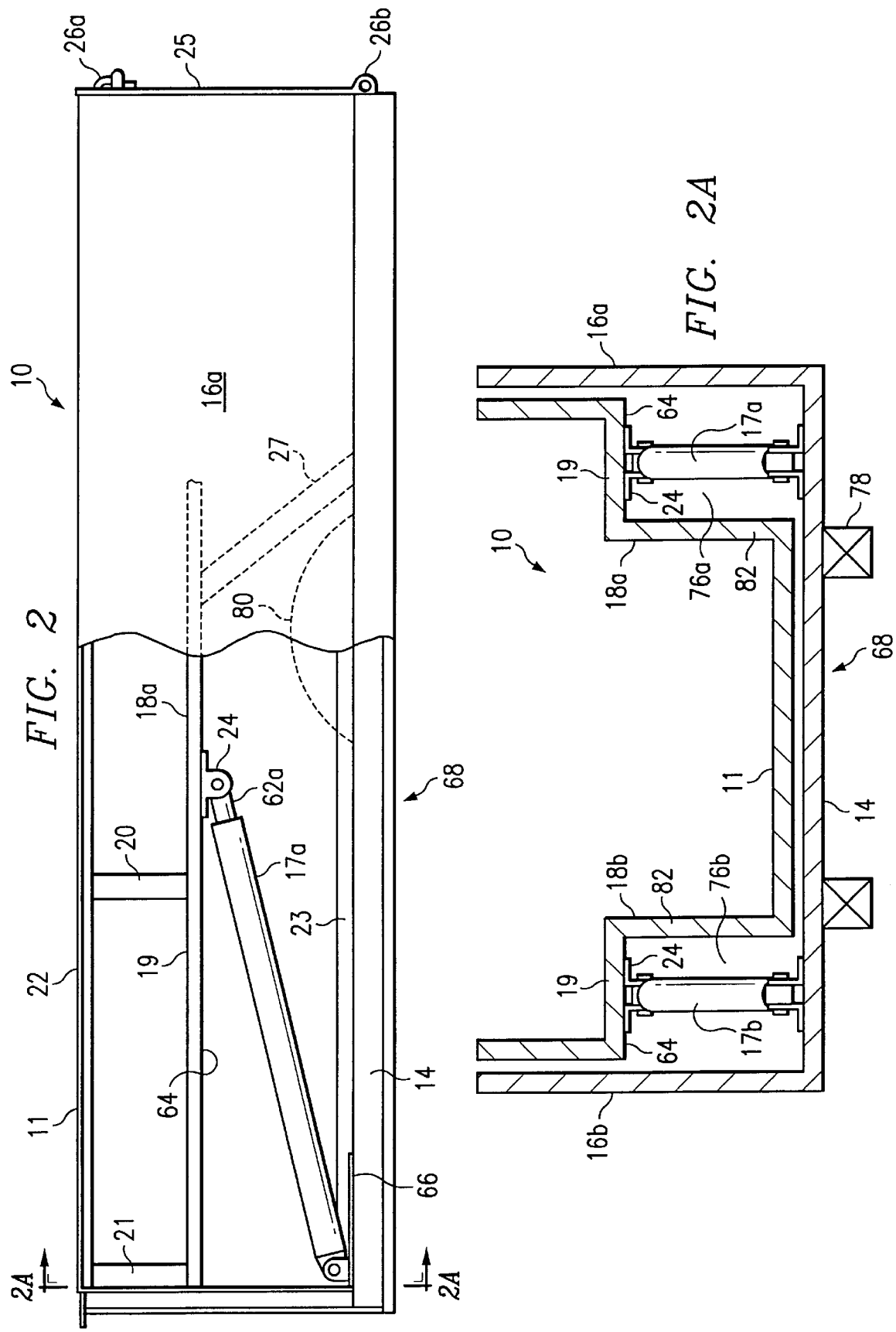
FIG. 2 is a side view of a typical truck bed with the invention installed therein, with parts removed to show the hydraulic rams in a retracted position and showing their associated brackets.

FIG. 2 shows the lifting apparatus 10 within the truck bed 68 in a lowered position. Hydraulic ram 17a is shown in a retracted position and is hinged through a clevis bracket 66 which in turn is preferably bolted to the bottom 14 of the truck bed 68. Vertical structural members 20 and 21 and horizontal members 22 and 23 are used to strengthen the liner body 11. In the illustrated embodiment, a piston of the single-acting ram 17a acts against a lower surface of horizontal member 19 of the liner body through an attached rod eye bracket 24. A gate 25 is removably installed, either on the truck body or on the liner body 11 as shown, to retain loose material in the liner body 11 when carrying such material. Gate 25 is retained by locking pins and hinges 26a and 26b.

FIG. 2a is a sectional view of the liner body 11 in its lowered position with respect to the truck bed 68. The lifting mechanisms, which in the preferred embodiment are comprised of hydraulic rams 17a and 17b, are housed within respective compartments 76a and 76b. The compartments 76a and 76b are defined by the interior surfaces of the conventional truck bed sides 16a and 16b, on the outside; the external surfaces of the vertical sidewalls 82 forming the liner body recesses 18a and 18b, on the inside; the bottom 14 of the truck bed 68, on the bottom; and the lower surface 64 of the horizontal members 19 forming a portion of the recesses 18a and 18b, on the top. In a preferred embodiment, the width of the compartments 76a and 76b is not determined by the width of the hydraulic rams which they house, but rather by the width of the truck wheel wells over which the recesses 18a and 18b are designed to fit. To minimize flexion at the corner of each horizontal member 19 and vertical sidewall 82, at least the upper ends of hydraulic rams 17a and 17b should be disposed as close to the vertical sidewall as possible without contacting same. Also, if the upper brackets 24 are mounted to be closer to each other than the lower brackets 66, so as to present a "toed in" appearance in a plane equivalent to that shown in FIG. 2a, the liner will have less of a tendency to sway side to side under horizontal loading.

Apart from the recesses 18a and 18b, the liner body 11 fits closely to the bottom 14 and sides 19 of the conventional truck bed for maximum carrying space. The truck bed 68 is attached by conventional means to a chassis indicated schematically at 78.

Figure 3:
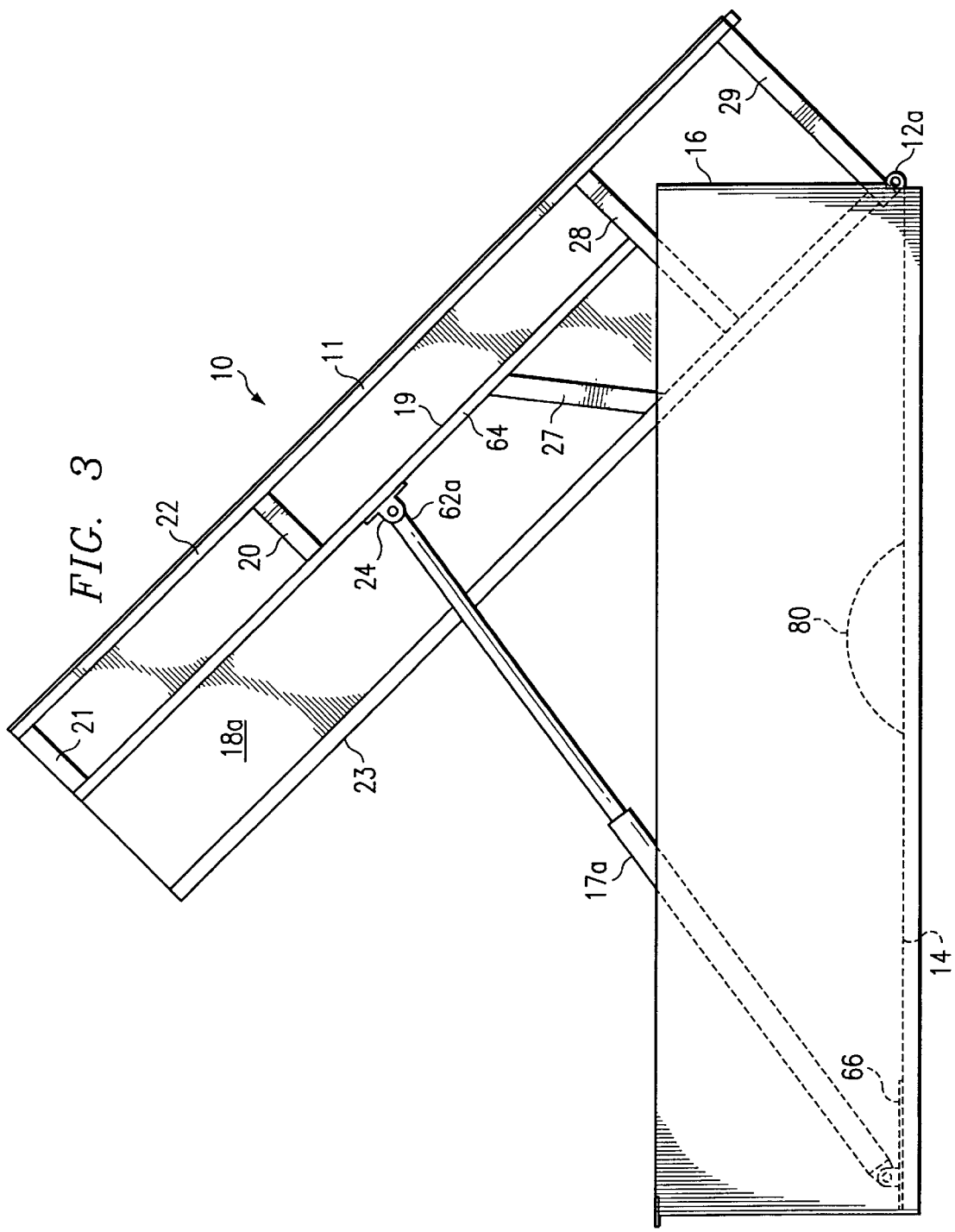
FIG. 3 is a side view of the truck bed shown in FIG. 2 showing the bed liner in a fully raised position with the rams fully extended.

FIG. 3 shows the liner body 11 raised to a dumping position. Rams 17 (ram 17a shown) are fully extended with the rod or piston thereof pushing against the member 19 of the liner body, such that the front end of the liner body is raised substantially relative to its rear end. The horizontal member 19 also serves as the top portion or plate of the recess 18a. Rams 17a and 17b preferably are of a single-acting type, pushing up only when hydraulic pressure is applied. Tailgate 25 (FIG. 2) should be removed prior to this operation. The liner 11 preferably is hinged at its rear end with hinges 12a and 12b (FIG. 1) to the bottom 14 of the truck bed 68. The rear portion of liner body 11 is strengthened with vertical frame members 28 and 29, and with a sloping member 27 which conforms in a general way to the rearmost portion of the wheel well 80 of the truck bed 68 when the liner is in a lowered position. Members 27–29 are repeated on the side not illustrated.

In prior art designs, the hydraulic rams 17a and 17b were so positioned that the liner width was constricted inwardly from the inner faces of the wheel wells 80 of the truck bed sidewalls 16a and 16b, from front to back, narrowing the usable volume of the liner. The present invention, on the other hand, uses the "dead space" in front of the truck bed wheel wells 80 as compartments for the liner body lifting mechanisms, thereby minimizing the loss of useful carrying volume.

Figure 4:
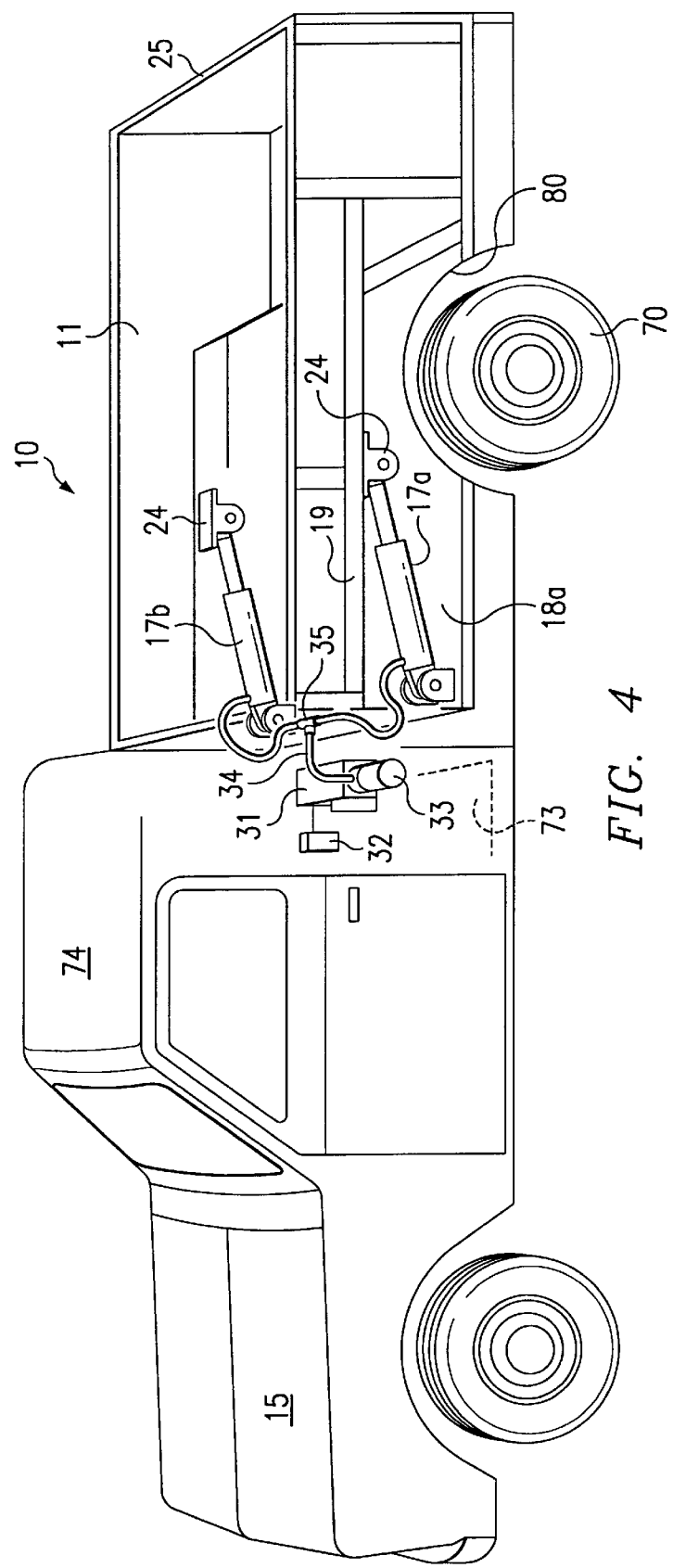
FIG. 4 is a perspective view of a truck with the bed liner of the invention in a lowered position, a left rear side panel of the truck body having been removed to show internal detail, a right hydraulic ram and associated components being shown in hidden line.

In FIG. 4 the truck 15 and the liner body 11 are shown in a perspective view with the liner body 11 in a lowered position. In this view, the side of the truck body is removed for clarity and to show the retracted position of the ram 17a. The invention provides a hydraulic power unit 31 located on the floor 73 in the back of the cab 74 of the truck 15. Prior art designs show the power unit located on the floor of the front of the truck bed, occupying space which ought to be used for payload.

The present invention uses a pushbutton switch 32 for extending the rams 17a and 17b, and a manually operated flow control valve 33 for lowering liner body 11. FIG. 4 shows hydraulic line 34 to operate the hydraulic cylinders. A single hydraulic line 34 exits the pumping unit through a suitable fitting and flexible hydraulic hose to a divider fitting 35. From there the hydraulic pipes are routed into the lifting mechanism compartments 76a and 76b, on both sides on the front of the bottom of the truck bed 14, occupying minimal space. Each line goes through a short length of flexible hose to enter the lower end of the ram 17a or 17b through a port.

Figure 5:
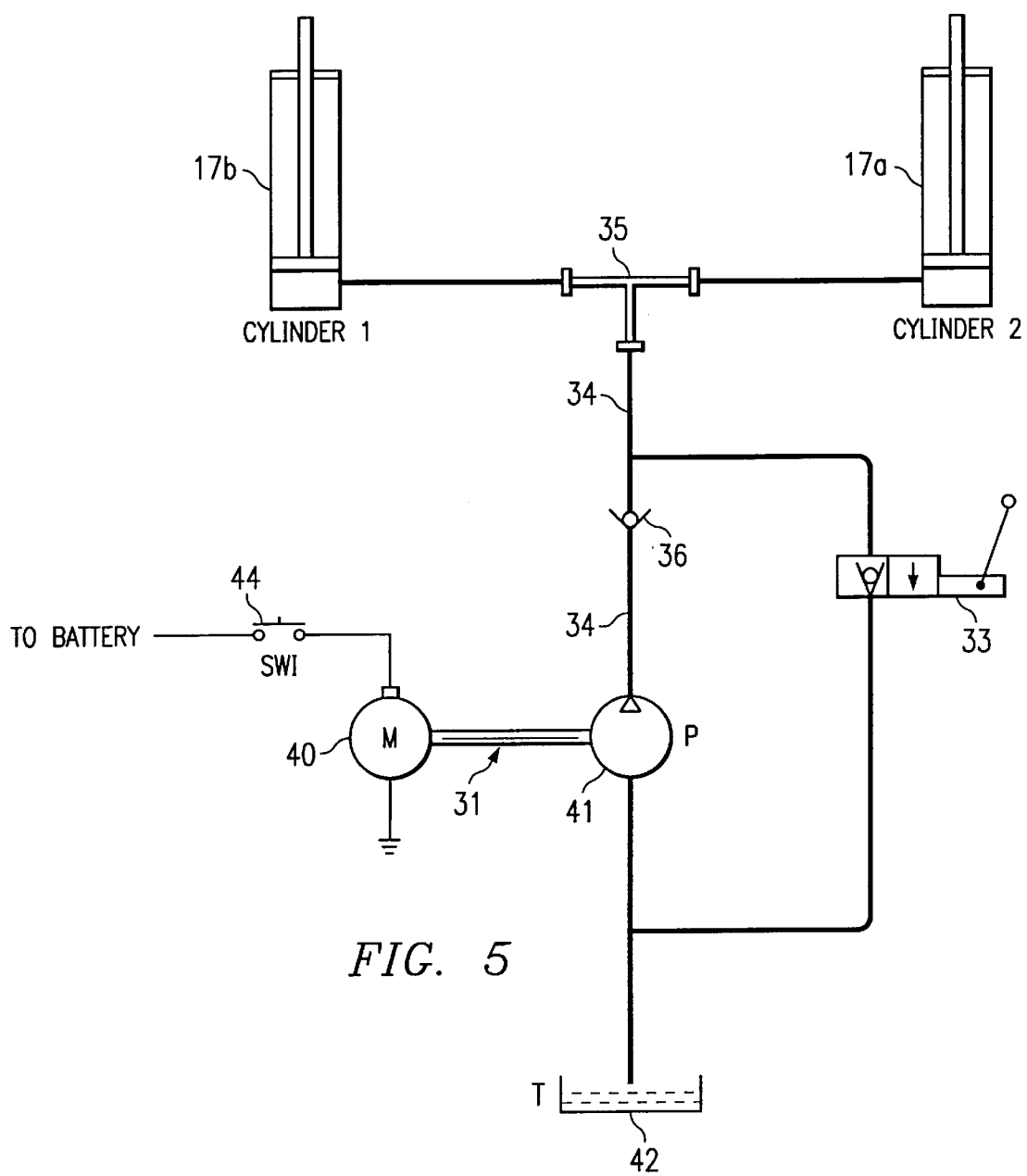
FIG. 5 is a schematic diagram of a hydraulic system incorporated into a preferred embodiment of the present invention.

FIG. 5 is a diagram of a representative hydraulic system for raising and lowering the apparatus. The power unit 31 consists of a DC electric motor 40 which provides torque to hydraulic pump 41 to pump hydraulic fluid from a reservoir tank 42 through line 34 and through a check valve 36 to each of the hydraulic cylinders 17. The flow control valve 33 is manually actuated to allow the fluid to drain back into the tank in order to lower the cylinders. Control valve 33 is typically located on the power unit but can be located under the seat or next to the steering column in cab 74, as desired. Rams 17a and 17b will contract and lower to their normal, retracted position due to the weight of the liner body 11, urging the fluid to drain back into tank 42, when the valve 33 is shifted to the "lower" position. The combination of the pump and relief valve creates a lifting and lowering mechanism which is both simple and safe to operate.

Figure 6:
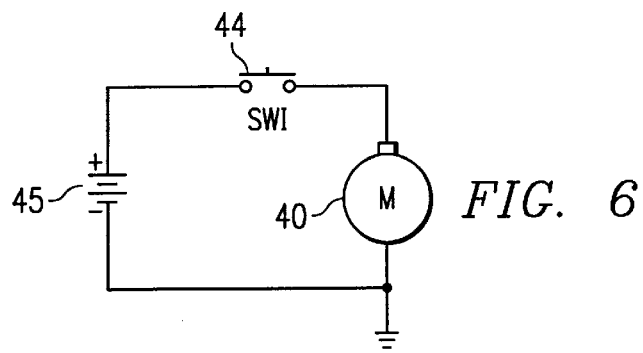
FIG. 6 is a diagram of a wiring circuit for the electrical controls for the dumping operation of the present invention.

FIG. 6 is a diagram of a representative electrical circuit used for operating the lifting apparatus. To cause the bed liner to rise, pushbutton 44 is used to engage the motor 40. Pushbutton 44 is connected to the positive connection of the truck battery 45. The second side of the motor 40 is connected to the ground connection of the truck battery. This simple electrical control is all that is necessary. The lifting apparatus will raise the bed liner only when the pushbutton 44 is depressed. As soon as the pushbutton is released, the lifting operation stops. The fluid cannot flow back to the tank because of the check valve 36 in line 34 and the check valve in control 33 (FIG. 5).

In place of the electrical and hydraulic system shown in FIGS. 5 and 6, an alternative hydraulic system may be used by which torque is taken directly from the engine crankshaft, and transmitted to a belt-driven hydraulic pump. Such an alternative hydraulic system might be more suitable for an integrated OEM design.

In summary, the present invention provides a novel, dumpable liner for a pickup truck in which the lifting apparatus occupies substantially only "dead space" in front of the wheel wells of a conventional pickup truck bed, thereby taking up almost no space which is otherwise usable. Because almost no modification needs to be done to a conventional pickup truck for installation, the present invention enables the creation of a pickup truck with a "hidden" dump feature. With its simple, one-action operation, the present invention is uniquely suitable for retrofitting to conventional pickup trucks.

While the detailed description has described an illustrated embodiment, the present invention is not limited thereto but only by the scope and spirit of the appended claims.

What is claimed is:

1. A dumping bed liner for a pickup truck having a bed with a bottom, and left and right sidewalls with inwardly protruding wheel wells, the dumping bed liner comprising:
    a liner body having a front end and a rear end, a left sidewall with a front end, a rear end and a bottom margin, a right sidewall with a front end, a rear end and a bottom margin, a bottom panel of the liner body extending between the bottom margins of the left and right sidewalls;
    a left inwardly protruding recess of the left liner sidewall formed at the junction of the bottom panel and the left sidewall of the liner to fit over an inwardly protruding left wheel well of the left sidewall of the bed, the left recess extending forwardly of the wheel well to define a left lifting mechanism compartment bounded on the outside by the left sidewall of the bed, on the inside by the left sidewall of the liner body, and on the rear by the left wheel well of the truck bed;
    a right inwardly protruding recess of the right liner sidewall formed at the junction of the bottom panel and the right sidewall of the liner to fit over an inwardly protruding right wheel well of the right sidewall of the bed, the right recess extending forwardly of the right wheel well of the bed to define a right lifting mechanism compartment bounded on the outside by the right sidewall of the truck bed, on the inside by the right sidewall of the liner body, and on the rear by the right wheel well of the truck bed; and
    left and right lifting mechanisms operable to lift the front end of the liner relative to the rear end of the liner and each assuming a retracted position while not in use, each lifting mechanism housed substantially within a respective one of the lifting mechanism compartments when in the retracted position.

2. The dumping bed liner of claim 1, wherein the bottom panel of the liner body has a front end, the liner body further including a front panel affixed to the front ends of the left sidewall, the right sidewall and the bottom panel of the liner body, the left and right lifting mechanism compartments extending forwardly from the respective bed wheel wells to be bounded in a forward direction by the front panel of the liner body.

3. The dumping bed liner of claim 2, wherein the right and left inwardly protruding recesses each have a top face which is disposed at a substantially constant elevation and is continuous from a position adjacent a respective one of the bed wheel wells to the front panel of the liner body.

4. The dumping bed liner of claim 3, wherein the top faces of the left and right inwardly protruding recesses are substantially planar.

5. The dumping bed liner of claim 1, wherein the left and right lifting mechanisms are linear hydraulic rams.

6. The dumping bed liner of claim 5, wherein each of the inwardly protruding recesses has a top portion, one end of each linear hydraulic ram being hingedly attached to a bottom surface of the top portion of a respective said recess.

7. A pickup truck with a hidden dump feature, comprising:
    a chassis on which right and left rear wheels are rotatably mounted;
    a conventional pickup truck bed mounted on the chassis above the right and left rear wheels and having a left inner sidewall, a right inner sidewall, and a bottom panel extending between the left and right inner sidewalls;
    a liner body having a left sidewall, a right sidewall, and a bottom panel extending between the left and right sidewalls of the liner body, the liner body having a front end and a rear end;
    a left inwardly protruding recess formed in the left sidewall of the liner body at its junction with the bottom panel of the liner body and extending forwardly from a position above the left rear wheel, a left lifting mechanism compartment defined between the left recess of the liner body and the left inner sidewall of the pickup truck bed;
    a right inwardly protruding recess formed in the right sidewall of the liner body at its junction with the bottom panel of the liner body and extending forwardly from a position above the right rear wheel, a right lifting mechanism compartment defined between the right recess of the liner body and the right inner sidewall of the pickup truck bed; and
    left and right lifting mechanisms housed in respective ones of the lifting mechanism compartments, the left and right lifting mechanisms operable to lift the front end of the liner body relative to the rear end thereof.

8. The pickup truck of claim 7, wherein the left and right lifting mechanisms each comprise a linear hydraulic ram.

9. The pickup truck of claim 8, wherein each of the inwardly protruding recesses has a top portion with a lower surface, one end of each of the linear hydraulic rams hingedly connected to a respective one of the top portions of the recesses at the lower surface thereof.

10. The pickup truck of claim 7, and further comprising a cab disposed forwardly of the pickup truck bed, a control coupled to the left and right lifting mechanisms disposed in the cab for controlling the lifting of the liner body.

11. The pickup truck of claim 8, and further comprising a single-action control hydraulically coupled to each of the hydraulic rams, the control urging the hydraulic rams to extend while actuated.

12. The pickup truck of claim 7, wherein the pickup truck bed has a rear margin, the rear end of the liner body being hinged to the rear margin.

* * * * *